Patented July 7, 1953

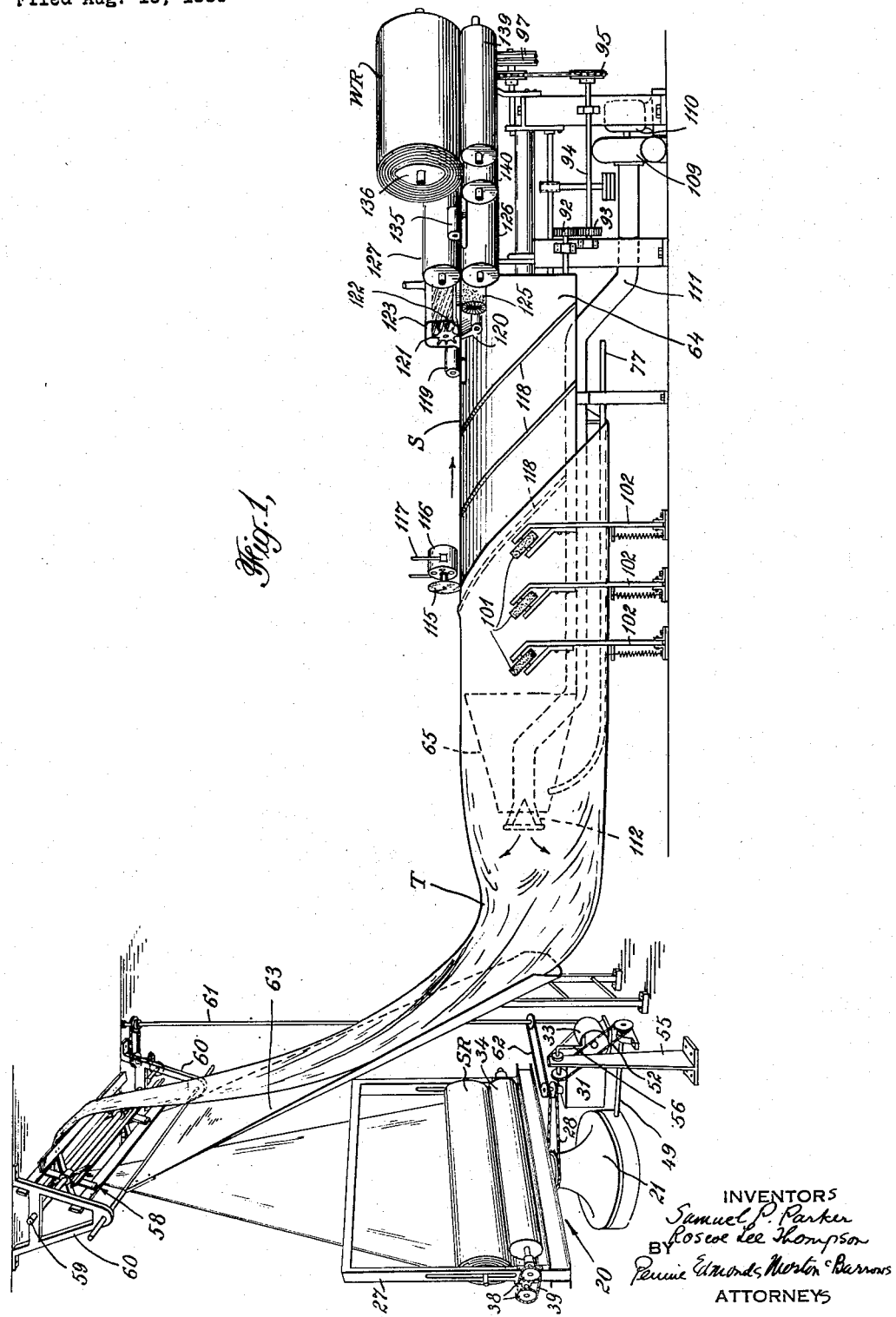

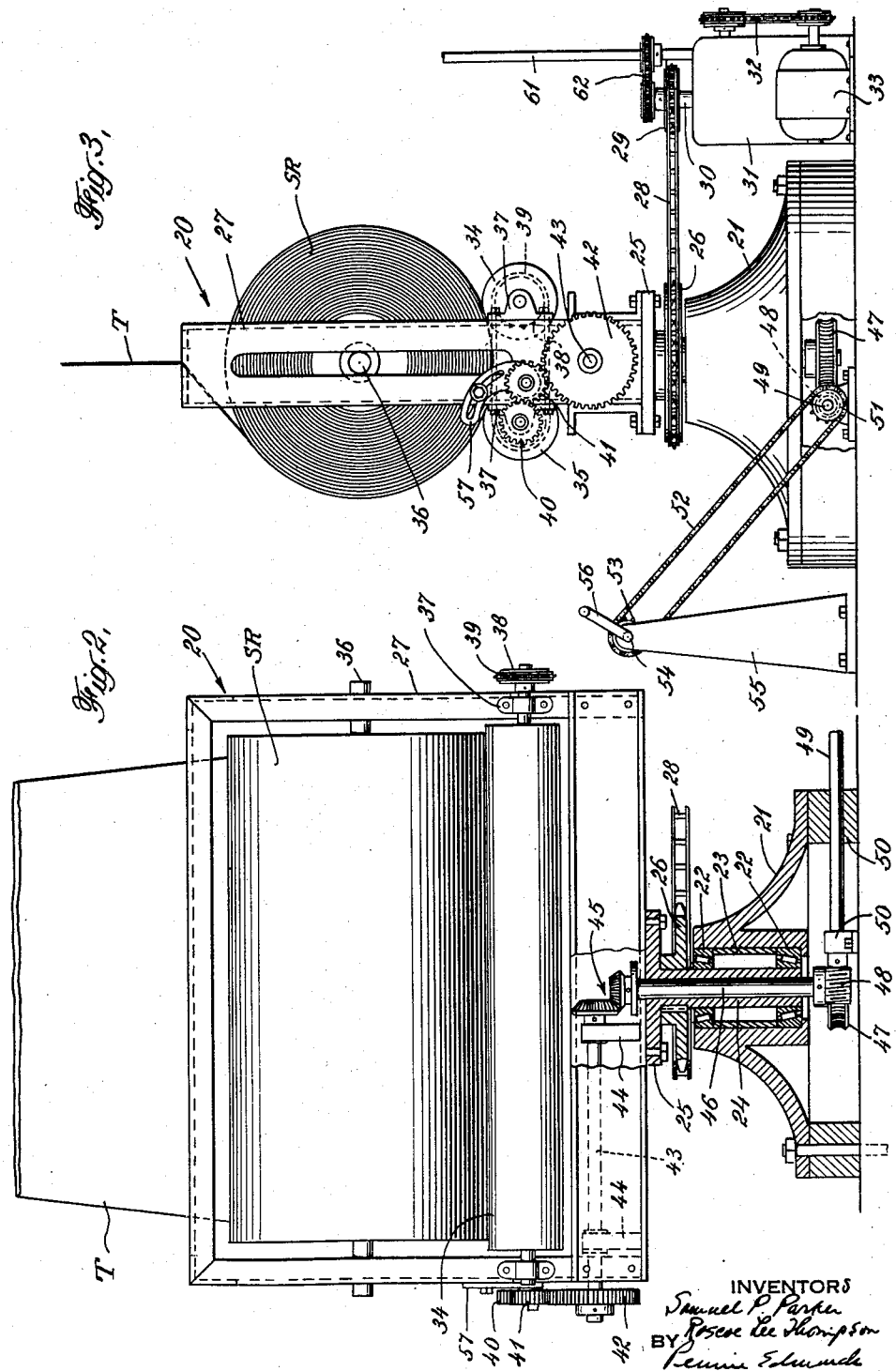

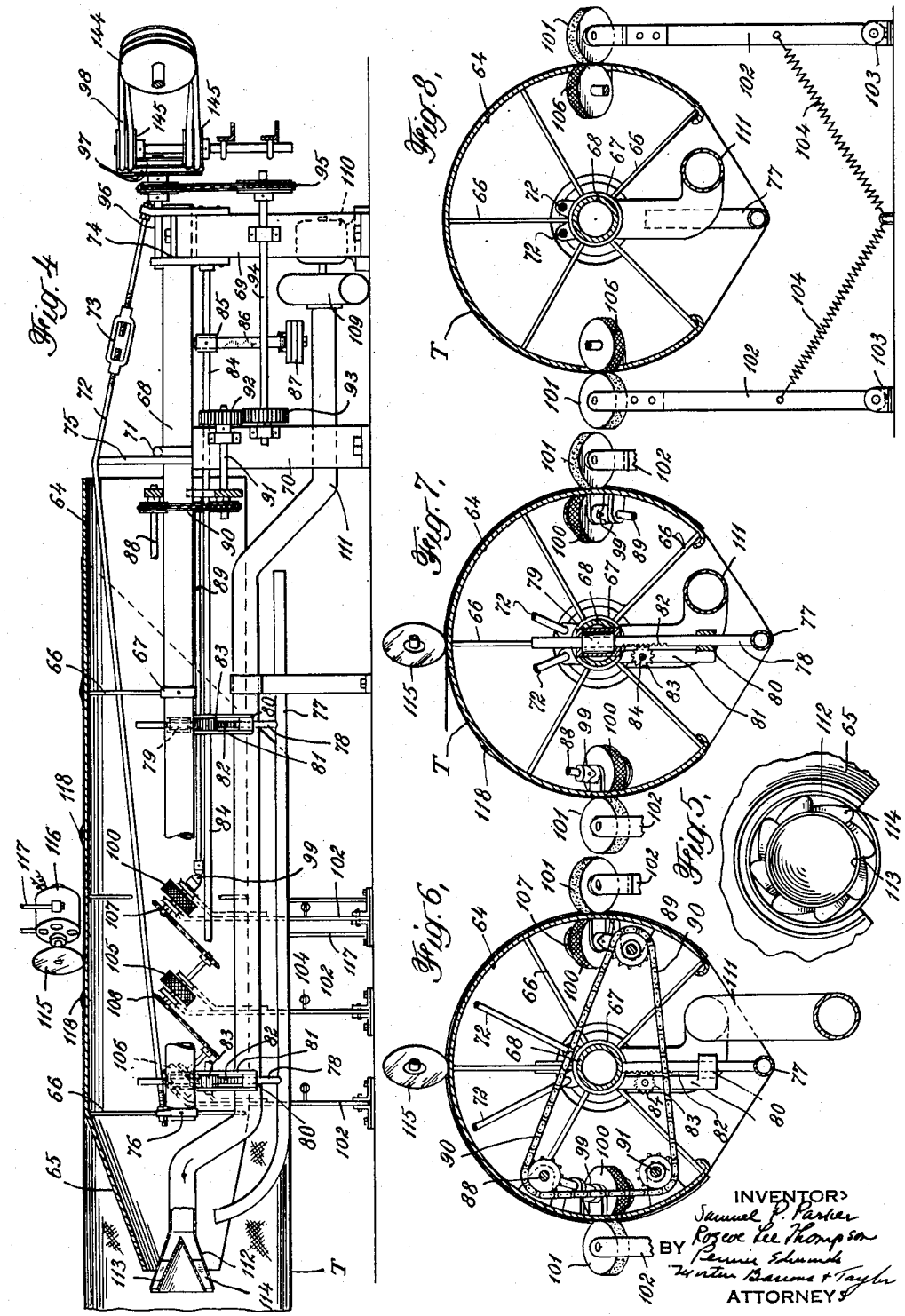

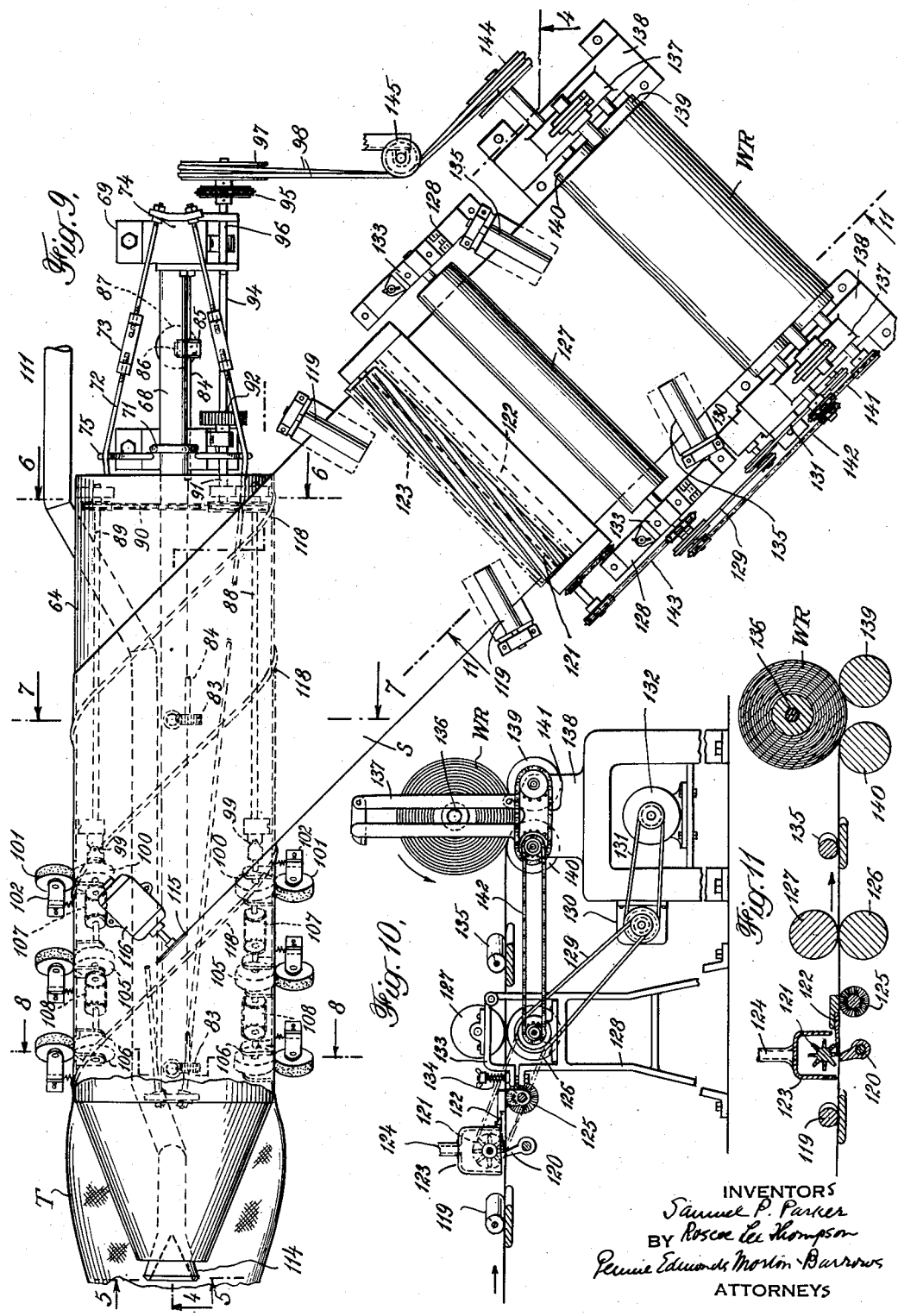

2,644,522

UNITED STATES PATENT OFFICE 2,644,522

BIAS CUTTING MACHINE

Samuel P. Parker and Roscoe Lee Thompson, La Grange, Ga., assignors to Callaway Mills Company, La Grange, Ga., a corporation of Georgia Application August 15, 1950, Serial No. 179,598

9 Claims. (Cl. 164—65)

This invention relates to machines for cutting a tubular fabric to produce a strip, in which the warp and filling yarns are on the bias, and is concerned more particularly with a novel machine of the kind referred to, which is adapted to operate on heavy fabrics, such as those used in the manufacture of reinforced rubber belts. The new machine is so constructed that it feeds the fabric tubing to the cutter under close control, so that the strip produced is of a quality kept at all times within close limits.

Machines for cutting a tubular fabric into a strip have been built heretofore and are in regular use in the production of narrow strips of light fabrics for use, for example, as bias bindings. In such prior machines, the weight and diameter of the fabric tubing are such that the problem of feeding the tubing to the cutter presents little difficulty. Such machines as heretofore constructed are not, however, satisfactory for use in the production of strips from a heavy fabric, such as a chafer fabric for use in tires, hose, belts, etc., which may be woven double in a width of 50", for example, and is to be cut at an angle of 45° to produce a strip about 70.7" wide with a permissible variation of about 1% in width and 3° in angle. The reason is that prior available machines do not include adequate means for feeding the fabric tube to the cutter with the regularity and uniformity required to cut so heavy a fabric and produce a strip within the specifications set forth.

The invention is, accordingly, directed to the provision of a machine capable of handling large diameter tubing of heavy weight fabric and cutting the tubing to form a bias strip closely uniform in width and containing warp and filling threads, the variations in the length of which are kept within very small limits. The successful performance of the new machine results from the fact that the machine includes a new combination of instrumentalities, which advance the fabric tube from the supply to the cutter at a uniform rate, so that the fabric is under even and regular tension and is smooth and unwrinkled as it is cut. The use of these features thus make possible the production of bias strips, which are of so great width and weight that they cannot be made on prior machines.

For a better understanding of the invention, reference may be made to the accompanying drawings, in which Fig. 1 is a view, partly in side elevation and partly in perspective, of the machine with parts omitted;

Fig. 2 is a view, partly in front elevation and partly in vertical section, of the supporting means for the supply roll of tubular fabric;

Fig. 3 is a view in end elevation of the supporting means shown in Fig. 2;

Fig. 4 is a longitudinal vertical sectional view of the mandrel on the line 4—4 of Fig. 9;

Fig. 5 is an end view of the small end of the mandrel on the line 5—5 of Fig. 9;

Figs. 6, 7, and 8 are sectional views on the lines 6—6, 7—7, and 8—8, respectively, of Fig. 9;

Fig. 9 is a plan view of the mandrel and the take-up for the strip;

Fig. 10 is a side elevational view of the take-up and associated devices; and

Fig. 11 is a sectional view on the line 11—11 of Fig. 9.

The machine illustrated in the drawings comprises a turntable 20 for supporting a supply roll SR of the tubular fabric T with its axis horizontal, the turntable being constructed to rotate the roll on its own axis to feed the tubing therefrom and also to rotate the roll on a vertical axis to put twist in the tubing being fed. The turntable comprises a base 21 having a vertical passage containing upper and lower roller bearings 22 separated by a spacer 23 and a tubular shaft 24 is mounted for rotation in the bearings and is provided at its upper end with an integral disc 25 secured to the hollow base of a frame 27. Between the disc and the base, a sprocket wheel 26 is keyed to shaft 24 and the wheel is connected by a chain 28 to a gear 29 on the output shaft 30 of a gear reduction box 31 driven through a belt 32 by a motor 33.

The supply roll SR rests upon a pair of driven rolls 34, 35, with the spindle 36 of the roll guided in slots in the vertical end members of frame 27. The shafts of rolls 34, 35 are mounted in bearing brackets 37 on frame 27 and, at one end, the shafts carry sprocket wheels 38 connected by a chain 39, so that rolls 34, 35 rotate in unison. The shaft of roll 35 carries a pinion 40 meshing with an idler pinion 41, which in turn meshes with a gear 42 on a shaft 43 mounted in bearing blocks 44 within the hollow base of frame 27. Shaft 43 is connected by gearing 45 to a vertical shaft 46, which extends through the tubular shaft 24 and is provided at its lower end with a worm wheel 47 meshing with a worm 48 on a shaft 49 supported in bearing blocks 50. Shaft 49 projects out of the base 21 and its exposed end carries a gear 51 connected by a chain 52 to a gear 53 on a shaft 54 mounted in a standard 55 and provided with a crank handle 56. When the frame 27 is rotated on the axis of shaft 24 by motor 33, the engagement of worm wheel 47 with worm 48 causes the shaft 46 to rotate and drive rolls 34, 35 to rotate the supply roll SR to unwind it.

The fabric is to be cut at an angle of 45° to its length as the tube of fabric is rotated on its axis relative to a stationary cutter. Accordingly, one turn of twist must be given the fabric tube leaving the supply roll, while the tube advances a distance equal to twice its uncut width. This is accomplished by proper ratio of the gears 40, 41, and 42, through which rolls 34, 35 are driven. Gear 40 is a change gear replaceable by a gear of a different number of teeth whenever a change is made from one tubular fabric to another of a different width. Gear 41 is an idler gear fast on a stub shaft adjustably mounted in a curved slot in a bracket 57 attached to one of the end members of frame 27 and the gear may be shifted as required. By rotation of crank 56, shaft 46 may be driven to rotate rolls 34, 35 to take up slack in the fabric at the beginning of a cutting operation.

The fabric tubing T unwound from roll SR passes through a slot in a cross-bar at the top of frame 27 and is then led over a reel 58 mounted on a shaft 59 supported in brackets 60 attached to the ceiling above the turntable. The reel is rotated by a suitable connection between its shaft 59 and a vertical shaft 61, which is connected through a chain 62 to the output shaft 30 of gear reduction box 31. The surface speed of the reel is slightly in excess of the delivery speed of the turntable, so that the length of fabric between the supply roll and the reel is kept taut at all times.

From the reel 58, the fabric tubing passes down over a scray 63 and is thence led in telescoping relation over a mandrel 64. The mandrel is of generally tubular form with a frusto-conical forward end 65, the bottom of the mandrel being open through an arc of approximately 90°. The mandrel is made of sheet metal and it is supported from within by spokes 66 extending radially from a plurality of hubs 67 encircling a supporting shaft 68. The shaft projects out the rear end of the mandrel and its rear end rests upon and is secured by suitable means to a standard 69. The shaft is supported on a second standard 70 forward of standard 69 and is held in place on standard 70 by a clamping element 71. The weight of the shaft forward of standard 70 is supported by a pair of tie rods 72, each of which contains a turn-buckle 73 and is attached at its rear end to a fixture 74 carried by standard 69. The tie rods pass over arms 75 projecting outwardly from shaft 68 and their forward ends are secured to a collar 76 mounted on the forward end of the shaft.

In its travel over the mandrel, the tube T is kept taut by a tension bar 77, which extends lengthwise of the mandrel and is mounted on the lower ends of vertical rods 78, each of which extends through a linear ball bushing 79 mounted in an opening through shaft 68 and a similar bushing 80 in a bracket 81 extending downward from the shaft. Each rod 78 is formed with rack teeth 82 between its ends and the teeth on the rods mesh with respective pinions 83 on a shaft 84 mounted in bearings in brackets 81 and on the fixture 74. Outside the mandrel, shaft 84 carries a pulley 85 to which is attached the upper end of a strap 86 carrying a weight 87 at its lower end. The weight tends to rotate shaft 84 to move rods 78 downwardly and this causes the tension bar to bear through the opening in the mandrel against the inner surface of the fabric tubing and maintain the fabric tubing taut.

A pair of shafts 88, 89, extending lengthwise of the mandrel on opposite sides thereof, are mounted for rotation in bearing blocks secured to the inner surface of the mandrel, and the shafts are provided near their rear ends with gears connected by a chain 90 to a gear on a shaft 91. Shaft 91 carries a gear 92 meshing with a gear 93 on a shaft 94 mounted in bearing blocks on standards 69, 70 and provided with a gear connected by chain 95 to a gear on a shaft 96 carrying a double pulley 97 driven by a pair of belts 98. Shaft 88 is connected through a coupling 99 to the shaft of a roller 100 mounted on the inner surface of the mandrel for rotation on an axis at 45° to the axis of the mandrel. The roller 100 projects through an opening in the mandrel and bears against the inner surface of the tubing T. A roller 101 is mounted with its axis parallel to the axis of roller 100 in an arm 102 pivoted to a bracket 103 secured to the floor, the arm being acted on by a spring 104 to cause roller 101 to clamp the tubing T against the fixed roller 100. Forward of roller 100 are two similar skewed rollers 105, 106 engaged by associated rollers similar to roller 101. The shaft of roller 100 is connected by a chain 107 to the shaft of roller 105 and that shaft is connected by a chain 108 to the shaft of roller 106. At the opposite side of the mandrel are three pairs of skewed driving rollers similar to rollers 100, 101 and rotation of shafts 88 and 89 causes the skewed rollers within the mandrel to be rotated to advance the tube T of fabric over the mandrel along a helical path.

A blower 109 driven by a motor 110 is mounted beyond the rear end of the mandrel and supplies an air blast, which travels through a pipe 111 supported on brackets 81 and extending through the mandrel and into the frusto-conical end 65 thereof. At its forward end, the pipe 111 carries a nozzle 112 containing a central cone 113 and a plurality of vanes 114 between the outer surface of the cone and the inner surface of the outer casing of the nozzle. The vanes are so arranged that the blast issuing from the nozzle whirls in the same rotational direction as the tube T of fabric being moved over the mandrel. The blast opens up the fabric tube between the end of the mandrel and the scray 63, so that the tube is about full size as it reaches the mandrel, and, because of its whirling movement, the blast acts on the tube and facilitates its helical travel over the mandrel.

The fabric tube advancing along the mandrel is cut at a 45° angle by a disc cutter blade 115 mounted on the shaft of a motor 116 supported on a standard 117. In order to remove wrinkles from the material approaching the cutter and from the strip S produced by the cutting operation, the mandrel is provided on its outer surface with a rib 118 extending helically about the mandrel from one edge to the other in a number of convolutions along the path of travel of tubing T and of strip S. The rib may be conveniently formed of a length of tubing about ⅝" in diameter secured to the outer surface of the mandrel.

The strip S produced from tube T by the cutting operation is led from the mandrel at a 45° angle to the axis thereof and passes beneath a pair of suitably mounted skewed guide rolls 119 to maintain it to full width. From the spreader rolls, the strip passes over the cloth rest 120, beyond which is a rotary shearing reel 121 cooperating with a ledger blade 122 to remove loose threads, excess lint, etc. from the upper surface of the strip, the reel being enclosed within a casing 123 provided with a suction duct 124. Beyond the ledger blade, the under surface of the fabric is brushed by a driven rotary brush 125.

The strip is drawn from the mandrel by a pair of rolls 126, 127 gripping the strip on opposite faces. The lower roll 126 is mounted for rotation in bearing blocks on a support 128 and it is connected by a belt 129 to a pulley on the output shaft of a gear reduction box 130 driven through belt 131 by a motor 132. Roll 127 is mounted in bearing blocks on levers 133 pivoted on frame 128 and acted on by springs 134 to force roll 127 toward roll 126, so that the strip T is tightly gripped by the rolls.

The strip leaving the rolls 126, 127 is held taut by skewed guide rolls 135, similar to rolls 119, and is then wound on an arbor 136, the ends of which are guided in vertical slots in end members 137 of a support 138 carrying the gear reduction box 130 and motor 132. The strip is wound into a roll WR, which rests upon and is rotated by rolls 139, 140. The shafts of the rolls are mounted for rotation on support 138 and are connected by a chain 141 to rotate in unison. The shaft or roll 140 is connected by a chain 142 to the shaft of roll 126 and the shaft of the rotary shearer reel 121 is similarly connected by a chain 143 to the shaft of roll 126. The shaft of roll 140 carries a double pulley 144, about which belts 98 are trained, the belts being guided by idler pulleys 145.

In the operation of the machine, the fabric tubing T is fed from the supply roll SR by the rotation of the turntable rolls 34, 35 and is given one turn of twist for each length of tubing fed equal to twice the uncut width of the tubing laid flat. As the tubing leaves the supply roll, it is drawn taut by the action of reel 58 and then passes down the scray, at the bottom of which the tubing is opened up by the whirling air blast issuing from nozzle 112. The tubing is then advanced over the mandrel along a helical path partly by the action of the skewed rollers and partly by the pull on the strip S applied by the rolls 126, 127. The surface speeds of rolls 126, 127 and 139, 140 and of the skewed rollers are correlated to the rotation of the supply roll SR by rolls 34, 35, in such manner that the fabric tubing moves smoothly along the mandrel and the strip is taken therefrom and wound at the proper rate. The use of the reel 58 makes it possible to maintain the tubing taut between the reel and the supply roll and, at the same time, permits a slight accumulation of the tubing at the bottom of the scray. As the tubing leaves the scray and approaches the mandrel, it is fully inflated by the blast, the whirling of which helps to maintain the rotational movement of the tubing. The tubing is kept taut against the mandrel by the tension bar and wrinkles are removed by the rib on the mandrel. As the strip leaves the mandrel, it is maintained at full width by the skewed guide rolls and loose threads, excess lint, etc. are removed by the shearing reel and the brush.

The combination of feeding and guiding means described, namely, the turntable rotated on a vertical axis at the proper rotational speed in relation to the feed of the tubing, the reel above the turntable, the scray, the nozzle producing the whirling air blast, the skewed feeding rollers, the rib for removing wrinkles, the skewed guiding rolls, and the takeup and winding rolls, has proved highly effective in feeding the tubing at a uniform rate to the cutter. As a result, it has been possible on the new machine to cut heavy chafer fabric of an uncut width of 50" with as little variation in the strip as 1% in width and 3° in longitudinal angle.

We claim:

1. In a machine for cutting a tubular fabric on the bias to form a strip and having a mandrel, over which the fabric is to be led in telescoped relation to the mandrel, and a knife cutting in a plane at an angle to the axis of the mandrel, the combination of a support for holding a roll of the fabric with its axis horizontal, the support being rotatable on a vertical axis and including a rotary element engaging the roll and rotatable to rotate the roll to unwind it, a rotary guide for the fabric tube unwound from the roll, the guide being mounted for rotation on a stationary axis at a higher level than the supported roll, pairs of rollers adapted to move the fabric tube over the mandrel along a helical path, one roller of each pair being mounted within the mandrel to engage the inner surface of the tube and the other roller of the pair being mounted outside the mandrel to engage the outer surface of the tube and press the tube against the inner roller, means for drawing the strip from the mandrel, means for rotating the support and the rotary element in timed relation to each other, means for driving at least one roller of each pair and the strip drawing means at the same surface speed, said speed bearing a constant relation to the rate at which the fabric is unwound from the fabric roll by the rotary element, means for directing an air blast into the tube, as it approaches the mandrel, to inflate the tube, and means for rotating the guide at a surface speed higher than the speed of the tube being unwound from the roll.

2. In a machine for cutting a tubular fabric on the bias to form a strip, the combination of a support for a roll of the fabric, the support being rotatable on a vertical axis and including a rotary element engaging the roll and rotatable to rotate the roll to unwind it, a rotary guide mounted for rotating on a stationary axis at a higher level than the supported roll and over which the fabric from the roll passes, a mandrel, over which the tube of fabric is guided in telescoped relation thereto, a knife for cutting the fabric, as it travels over the mandrel, at an angle to the axis of the mandrel to produce a strip, means for advancing the tube of fabric over the mandrel along a helical path and drawing the strip from the mandrel, said means including rollers inside and outside the mandrel for engaging the tube at the same angle to the axis of the mandrel as the cut and rolls gripping the strip, means carried by the mandrel for directing an air blast into the tube, as it approaches the mandrel, to inflate the tube means for rotating the guide at a surface speed higher than the speed of the tube being unwound from the roll, means for rotating the support and the rotary element in timed relation to each other, and means for rotating the rollers and strip gripping rolls, at the same surface speed, said speed bearing a constant relation to the rate at which the fabric is unwound from the fabric roll by the rotary element.

3. In a machine for cutting a tubular fabric on the bias to form a strip and having a mandrel, over which the fabric is to be led in telescoped relation to the mandrel, a knife cutting in a plane at an angle to the axis of the mandrel, and means for drawing the strip from the mandrel, the combination of a support for holding a roll of the fabric with its axis horizontal, the support being rotatable on a vertical axis and including a rotary element engaging the roll and rotatable to rotate the roll to unwind it, a rotary guide mounted for rotation on a stationary axis at a higher level than the supported roll and over which the fabric tube from the roll passes, pairs of rollers adapted to move the fabric tube over the mandrel along a helical path, one roller of each pair being mounted within the mandrel to engage the inner surface of the tube and the other roller of the pair being mounted outside the mandrel to engage the outer surface of the tube, means for rotating the support and the rotary element in timed relation to each other, means for driving at least one roller of each pair at a surface speed bearing a constant relation to the rate at which the fabric is unwound from the fabric roll by the rotary element, means, including a nozzle with vanes for directing an air blast into the tube, as it approaches the mandrel, to inflate the tube, said vanes causing the blast issuing from the nozzle to whirl the blast in the same rotational direction as the tube traveling along the mandrel, and means for rotating the guide.

4. A machine for cutting a tubular fabric on the bias to form a strip, which comprises a support for holding a roll of the fabric with its axis horizontal, the support being rotatable on a vertical axis and including a rotary element engaging the roll and rotatable to rotate the roll to unwind it, a rotary guide for the fabric tube unwound from the roll, the guide lying at a higher level than the supported roll, a hollow mandrel, over which the fabric tube is to be led in telescoped relation to the mandrel, pairs of rollers adapted to move the fabric tube over the mandrel along a helical path, one roller of each pair being mounted within the mandrel to engage the inner surface of the tube and the other roller of the pair being mounted outside the mandrel to engage the outer surface of the tube and press the tube against the inner roller, a knife for cutting the fabric, as it travels over the mandrel, at an angle to the axis of the mandrel to produce a strip, means for drawing the strip from the mandrel, a rib on the outer surface of the mandrel for engaging the inner surface of the fabric tube, the rib extending helically and along the path of travel of the tube, means for directing an air blast into the tube, as it approaches the mandrel, to inflate the tube, means for rotating the support and the rotary element in timed relation to each other, and means for driving at least one roller of each pair and the strip drawing means at the same surface speed, said speed bearing a constant relation to the speed at which the fabric is unwound from the fabric roll by the rotary element.

5. A machine for cutting a tubular fabric on the bias to form a strip, which comprises a support for holding a roll of the fabric with its axis horizontal, the support being rotatable on a vertical axis and including a rotary element engaging the roll and rotatable to rotate the roll to unwind it, a rotary guide for the fabric tube unwound from the roll, the guide lying at a higher level than the supported roll, a hollow mandrel, over which the fabric tube is to be led in telescoped relation to the mandrel, means carried by the mandrel for engaging the tube from within and placing it under tension transversely, pairs of rollers adapted to move the fabric tube over the mandrel along a helical path, one roller of each pair being mounted within the mandrel to engage the inner surface of the tube and the other roller of the pair being mounted outside the mandrel to engage the outer surface of the tube and press the tube against the inner roller, a knife for cutting the fabric, as it travels over the mandrel, at an angle to the axis of the mandrel to produce a strip, means for drawing the strip from the mandrel, a rib on the outer surface of the mandrel for engaging the inner surface of the fabric tube, the rib extending helically and along the path of travel of the tube, means for directing an air blast into the tube, as it approaches the mandrel, to inflate the tube, means for rotating the support and the rotary element in timed relation to each other, and means for driving the inner roller of each pair and the strip drawing means at the same surface speed, said speed bearing a constant relation to the speed at which the fabric is unwound from the fabric roll by the rotary element.

6. In a machine for cutting a tube of fabric on the bias to form a strip and having a mandrel, over which the tube is telescoped, and a knife cutting in a plane at an angle to the axis of the mandrel, the combination of a support for holding a roll of the fabric with its axis horizontal and including a frame rotatable on a vertical axis and at least one roll mounted for rotation in the frame and adapted to engage and support the fabric roll, the supporting roll being rotatable to unwind the fabric roll, a rotary guide, over which the tube unwound from the fabric roll passes, the guide being mounted for rotation on a stationary axis higher than the support, pairs of rollers for moving the fabric tube over the mandrel along a helical path, one roller of each pair being mounted within the mandrel to engage the inner surface of the tube and the other roller of the pair being mounted outside the mandrel to engage the outer surface of the tube and press the tube against the inner roller, means for drawing the strip from the mandrel, means for directing a blast of air into the tube, as it approaches the mandrel, to inflate the tube, means for driving at least one roller of each pair and the strip drawing means at the same surface speed, means for rotating the guide at a surface speed higher than the speed of the tube being unwound, and means for rotating the frame and the supporting roll in timed relation to each other, the surface speed of the supporting roll bearing a constant relation to the surface speed of the rollers and strip drawing means.

7. In a machine for cutting a tube of fabric on the bias to form a strip and having a mandrel, over which the tube is telescoped, and a knife cutting in a plane at an angle to the axis of the mandrel, the combination of a support for holding a roll of the fabric with its axis horizontal and including a frame rotatable on a vertical axis and at least one roll mounted for rotation in the frame and adapted to engage and support the fabric roll, the supporting roll being rotatable to unwind the fabric roll, a rotary guide, over which the tube unwound from the fabric roll passes, the guide being mounted for rotation on a stationary axis higher than the support, pairs of rollers for moving the fabric tube over the mandrel along a helical path, one roller of each pair being mounted within the mandrel to engage the inner surface of the tube and the other roller of the pair being mounted outside the mandrel to engage the outer surface of the tube and press the tube against the inner roller, a pair of rolls for gripping the strip between them and rotatable to draw the strip from the mandrel, means for directing a blast of air into the tube, as it approaches the mandrel, to inflate the tube, a scray guiding the fabric between the rotary guide and the mandrel, means for rotating said guide, means for rotating the strip gripping rolls and at least one roller of each pair at the same surface speed, and means for rotating the frame and supporting roll in timed relation, the surface speed of the supporting roll bearing a constant relation to the surface speed of the rollers and gripping rolls.

8. In a machine for cutting a tubular fabric on the bias to form a strip, the combination of a support for holding a supply roll of the fabric, the support including a frame rotatable on a vertical axis and at least one roll mounted in the frame and adapted to engage and support the supply roll, a rotary guide for the tube unwound from the supply roll, the guide being at a higher level than the support, a scray for guiding the tube leaving the rotary guide, a horizontal mandrel, means for advancing the tube over the mandrel in telescoped relation thereto along a helical path, said advancing means including pairs of rollers adapted to engage the inside and outside of the tube and grip it between them, a rib on the outer surface of said mandrel extending along said helical path, means for drawing the strip from the mandrel, means for directing a blast of air into the tube, as it approaches the mandrel, for inflating the tube between the mandrel and the scray, means for rotating the supporting roll to unwind the fabric tube from the supply roll, means for rotating the advancing rollers and operating the strip drawing means at the same surface speed, said speed bearing a constant relation to the rate of rotation of the supporting roll, and means for rotating the frame at a rate timed to the unwinding of the fabric supply roll by the supporting roll.

9. A machine for cutting a tubular fabric on the bias to form a strip, which comprises the combination of a support for holding a roll of fabric with its axis horizontal, the support being rotatable on a vertical axis and including a rotary element engaging the fabric roll and rotatable to rotate the fabric roll to unwind the fabric tube therefrom, a rotary guide for the fabric tube unwound from the roll, the guide being mounted for rotation on a stationary axis at a higher level than the supported roll, a mandrel, over which the tube of fabric is guided in telescoped relation thereto, a knife for cutting the fabric traveling over the mandrel at an angle to the axis of the mandrel to produce a strip, pairs of rollers inside and outside the mandrel for engaging the tube of fabric at the same angle to the axis of the mandrel as the cut and operable to advance the fabric, means carried by the mandrel for directing an air blast into the fabric tube, as it approaches the mandrel, to inflate the tube, a scray directing the fabric from the rotary guide to the inflating means, means for taking up the strip formed by the cut, means for rotating the support and the rotary element in timed relation to each other, means for rotating the guide, and means for rotating one advancing roller of each pair and the takeup means at the same surface speed, said speed bearing a constant relation to the speed at which the fabric tube is unwound from its roll by the rotary element.

SAMUEL P. PARKER.
ROSCOE LEE THOMPSON.

References Cited in the file of this patent

UNITED STATES PATENTS

| Number | Name | Date |
|---|---|---|
| 1,066,304 | Mitchell et al. | July 1, 1913 |
| 1,322,843 | Townsend | Nov. 25, 1919 |
| 1,643,157 | Gardner | Sept. 20, 1927 |
| 1,896,596 | Seddon | Feb. 7, 1933 |